(12) United States Patent
Thiel

(10) Patent No.: US 12,241,766 B2
(45) Date of Patent: Mar. 4, 2025

(54) THz MEASURING METHOD AND THz MEASURING DEVICE FOR DETECTING A MATERIAL FLOW

(71) Applicant: CiTEX Holding GmbH, Melle (DE)

(72) Inventor: Marius Thiel, Osnabrück (DE)

(73) Assignee: CiTEX Holding GmbH, Melle (DE)

(*) Notice: Subject to any disclaimer, the term of this patent is extended or adjusted under 35 U.S.C. 154(b) by 391 days.

(21) Appl. No.: 17/602,384

(22) PCT Filed: Apr. 9, 2020

(86) PCT No.: PCT/DE2020/100291
§ 371 (c)(1),
(2) Date: Oct. 8, 2021

(87) PCT Pub. No.: WO2020/207539
PCT Pub. Date: Oct. 15, 2020

(65) Prior Publication Data
US 2022/0163361 A1  May 26, 2022

(30) Foreign Application Priority Data
Apr. 9, 2019 (DE) .......................... 102019109340.6

(51) Int. Cl.
*G01F 1/7086* (2022.01)
*G01F 1/74* (2006.01)
(Continued)

(52) U.S. Cl.
CPC .............. *G01F 1/7086* (2013.01); *G01F 1/74* (2013.01); *G01N 21/85* (2013.01); *G01F 1/712* (2013.01); *G01N 2021/8592* (2013.01)

(58) Field of Classification Search
CPC .. G01N 21/17; G01N 21/3586; G01N 21/359; G01N 21/3595; G01N 21/85;
(Continued)

(56) References Cited

U.S. PATENT DOCUMENTS 6,575,043 B1   6/2003 Huang et al.
2004/0155665 A1*  8/2004 Arnone ............. G01N 21/3563
                                                    250/341.1
(Continued)

FOREIGN PATENT DOCUMENTS

DE   102011112697   2/2013
DE   102016103298   8/2017
(Continued)

OTHER PUBLICATIONS

International Search Report and Written Opinion for PCT/DE2020/100291 dated Jun. 9, 2020.
German Office Action for DE102019109340.6.

*Primary Examiner* — Kristina M Deherrera
*Assistant Examiner* — Fatemeh Esfandiari Nia
(74) *Attorney, Agent, or Firm* — Barnes & Thornburg LLP

(57) ABSTRACT

A method for detecting a material flow comprises:
  generating a THz beam with a THz sensor,
  guiding the THz beam through a material flow along at least one first optical axis,
  reflecting the THz beam with at least one reflector mirror detecting the reflected THz reflection beam and generating a signal amplitude,
  determining a reflector peak in the signal amplitude corresponding to the reflector mirror,
  evaluating the reflector peak in an evaluating step and determining material properties of the material flow depending on the evaluating step. A calibration measurement of a guiding device may first be carried out without any material flow, while storing the signal amplitude and/or a determined reflector peak of the signal amplitude, and
  guiding the material flow through the guiding device and acquiring the signal amplitude,
to determine differences of the signal amplitude of the calibration measurement and the subsequent measurement with the material flow.

20 Claims, 9 Drawing Sheets

Figure 2:
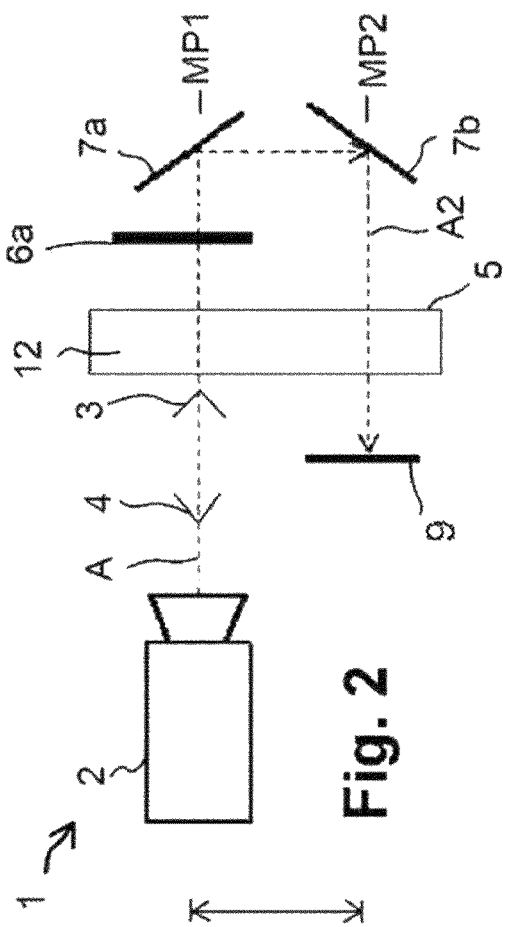

(51) Int. Cl.
  *G01N 21/85*  (2006.01)
  *G01F 1/712*  (2006.01)
(58) Field of Classification Search
  CPC ....... G01N 21/3581; G01N 2021/8592; G01N
        2021/0193; G01N 2021/3572; G01F
           1/7086; G01F 1/74; G01F 1/712
  See application file for complete search history.

(56)   References Cited

U.S. PATENT DOCUMENTS

| | | | |
|---|---|---|---|
| 2006/0169057 A1 | 8/2006 | Zweifel | |
| 2008/0149819 A1* | 6/2008 | Zhdaneev | G01N 21/3581 |
| | | | 250/336.1 |
| 2009/0198466 A1 | 8/2009 | Kajiki et al. | |
| 2010/0280779 A1* | 11/2010 | White | G01N 21/3586 |
| | | | 702/79 |
| 2017/0322064 A1 | 11/2017 | Sharma et al. | |
| 2018/0321068 A1* | 11/2018 | Meribout | G01F 1/712 |
| 2019/0107485 A1* | 4/2019 | Thiel | G01B 11/24 |
| 2020/0173766 A1* | 6/2020 | Thiel | G01N 21/3581 |

FOREIGN PATENT DOCUMENTS

| | | | | |
|---|---|---|---|---|
| WO | 2007143474 | 12/2007 | | |
| WO | WO-2007143474 A1 * | 12/2007 | ............ | E21B 47/10 |
| WO | 2009009785 | 1/2009 | | |
| WO | 2018175503 | 9/2018 | | |

\* cited by examiner

THz MEASURING METHOD AND THz MEASURING DEVICE FOR DETECTING A MATERIAL FLOW

CROSS REFERENCE TO RELATED APPLICATIONS

This application is a U.S. national stage application under 35 U.S.C. § 371 (b) of International Application No. PCT/DE2020/100291, filed Apr. 9, 2020, which claims priority to the German Patent Application No. 102019109340.6, filed on Apr. 9, 2019, the disclosures of both of which are hereby expressly incorporated by reference in their entirety.

The invention relates to a THz measuring method and a THz measuring device for detecting a material flow.

THz radiation may, in particular, be generated in a frequency range between 5 GHz and 50 THz, in particular between 10 GHz, 30 GHz or 300 GHz and 3 THz or 10 THz. The THz radiation may be generated optically, e.g. using a short pulse laser which uses short pulses to switch a photoelectric switching element to be conductive so as to connect a supplied voltage through to a dipole arrangement. Further, fully electronic THz sensors are known which use an electronically controlled dipole to generate a transmitted THz beam and receive a reflected THz reflection beam, in particular, for mixing the transmitted THz beam and the THz reflection beam for detecting times of flight or frequency shifts (FMCW). Hereby, a direct measurement of a time of flight of the THz radiation as well as a frequency modulation for measuring in a frequency domain may be provided, with continuous or pulsed radiation.

Material flows contain solid state particles or material particles respectively in a surrounding gas, e.g. air, the material flow being transported in a transport device, e.g. a pipe, trough or tube. The solid state particles may be e.g. a granulate, a powder, or even flakes or chops or fibers.

Various production processes require the exact detection of a material throughput. Hereby, in particular, gravimetric measuring methods are known in which the fed-in e.g. powder or granular material is transported across a scales and, thereby, a feed-in rate is determined as a dynamic amount of material by means of a weighing process.

In principle, such weighing processes provide a limited measuring accuracy and exhibit high volatility, in particular, due to mechanical loads and mechanical vibrations caused by the incoming material flow. Moreover, e.g. in the case of so-called gravimetric "loss in weight" processes no measurements can be performed at times where the weighing container is refilled.

For measuring throughput rates of liquids and gases ultra-sound detecting processes are known, e.g. using the Doppler Effect. However, when detecting material flows made of solid-state particles using Doppler measurements it is possible at best to detect the velocity of individual grains but not the number and distribution of the grains as well as the throughput rate in a precise manner.

The document US 2017/0322064A1 describes a method for determining a share of one or more phases in a multiphase fluid, in particular oil and water, where a measuring device emits a broad-band electromagnetic radiation towards the fluid so as to generate a resonance. Hereby, the radiation is emitted by an antenna through the fluid and received by a further antenna in transmission. In the measured signal characteristic resonances of the individual phases at specific frequencies may be detected.

The citation DE 10 2016 103 298 A1 shows a Terahertz-measuring device for determining a layer thickness of a layer of a measured object, where a mirror is provided behind the measured object which re-reflects THz radiation passing through the measured object. The document WO2007/143474A1 describes a method and a system for monitoring a fluid flowing through a pipeline.

The citation WO 2009/009785A1 describes a system and a method for determining a temporal peak value in temporal data for a time domain THz waveform, where the time domain THz waveform is detected and a central point of the edges of the waveform is determined, and subsequently a linear fit of the waveform is carried out for a point near the central point. From this it is possible to calculate a value.

The document US2009/0198466A1 describes an information receiving device for receiving information of an object using THz domain spectroscopy, where a device having a light source for generating pulse shaped pumped light, a detector means as well as a first and second time delay means is provided, and determined data are subsequently corrected.

The citation DE 10 2016 103 298 A1 describes a THz measuring device for determining at least one layer thickness of at least one layer of a measured object using a time of flight measurement, where in the optical axis of a THz sensor and receiver unit a mirror for reflecting THz radiation passing through the measured object is provided, and a controller and evaluation (analyzer) unit determines a total reflection peak in the detected reflected radiation to subsequently determine layer thicknesses of a measured object.

The document DE 10 2011 112 697 A1 describes a method and a device for determining a substance using THz radiation, where characteristics of a liquid are determined, and in addition to the liquid a gas is provided, in particular, in a container together with the liquid and with a bubble of the gas provided above the liquid. Hereby, measurements at boundary surfaces are carried out.

It is the object of the invention to create a THz measuring method and a THz measuring device for determining a material flow, in particular made of solid-state particles, allowing for a secure, precise as well as continuous detection of the material flow.

This task is solved by a THz measuring method and a THz measuring device according to the independent claims. Preferred further developments are described in the sub-claims. Further, an arrangement consisting of a THz measuring device and a guiding device for guiding the material flow and a method, in particular extrusion method, for manufacturing a production corpus using the THz measuring device and/or the THz measuring method is created.

The THz measuring method according to the invention may, in particular, be carried out using the THz measuring device according to the invention. The THz measuring device according to the invention is provided, in particular, for carrying out the THz measuring method according to the invention.

In the THz measuring device according to the invention, in particular, the controller and evaluation means is configured to carry out a method according to the invention for detecting a material flow.

Thus, a transmitted THz beam is guided along an optical axis through a material flow, in particular a guiding device for guiding a material flow, and reflected on at least one reflector mirror at least in part back to the THz sensor which supplies a signal amplitude as measured signal, in particular depending on peak positions which, depending on the measuring principle, may be different parameters. In the case of a direct time of flight measurement the peak positions correspond to time units, e.g. in the Picosecond range. In the case of a frequency modulation the peak positions may be frequency units. According to the invention, a reflector peak of the reflector mirror is determined in the signal amplitude of the THz sensor. Correspondingly, in the THz measuring device a controller and evaluation unit is provided internally or externally on the THz sensor carrying out a suitable evaluation (analysis) of the signal amplitude.

The THz radiation may be used, in particular, in a frequency range between 5 GHz and 50 THz, in particular between one of the following lower values of 10 GHz, 30 GHz or 300 GHz and one of the following upper values of 3 THz, 5 THz or 10 THz, whereby a signal amplitude can be determined as e.g. direct time of flight measurement of the THz radiation or frequency shift in the case of frequency modulated THz radiation, moreover, also with pulsed radiation.

The method according to the invention provides, in particular, for the transmitted THz beam to be within a frequency range of Terahertz, Radar, or microwave radiation, in particular between 5 GHz and 50 THz, in particular between a lower value von 10 GHz, 30 GHz or 300 GHz and an upper value of 3 THz, 5 THz or 10 THz, where the signal amplitude is determined as e.g. direct time of flight measurement of the THz radiation or frequency shift in the case of frequency modulated THz radiation.

The transmitted THz beam may, in particular, be irradiated perpendicular to the transport direction of the material flow, i.e. in particular, perpendicular to its guiding device, however, it may be aligned at any other angle thereto.

Since the transmitted THz beam will be affected depending on the technical and physical characteristics of the material flow, the reflector peak will be affected too so that in the signal amplitude the reflector peak and/or a further signal section, e.g. located before the reflector peak, can be evaluated (analyzed).

Hereby, various measuring methods or further developments respectively are provided, in particular detecting and evaluating the change in the reflector peak and/or the further signal segments prior to the reflector peak. Thus, it is possible, in particular, to carry out a calibration measurement without material flow or, respectively, with an empty guiding device and to subsequently detect changes in the same measurement with material flow, and/or measurements of the material flows are made at two measuring positions offset in the direction of flow and compared.

The various measuring principles and evaluations are essentially based on the fact that the reflection peak is shifted, attenuated, broadened and/or provided with additional signal components by the material particles when it passes the material flow so that various evaluations of the signal amplitude can be utilized to determine physical and technical characteristics, in particular, a material density and/or a material throughput.

When evaluating the signal shift it is possible to evaluate the permittivity, whereby the THz beam upon passing through material is slowed down as a function of its refraction index, i.e. the ratio of the speed of light compared to the speed of light in a vacuum. In the case of materials like plastics, rubber etc. the refraction index will be e.g. in a range of 1.3 to 1.7 so that a clear signal shift can be measured. Thus, it is possible for the reflector peak in the Signal diagram to be initially detected at a calibration measurement and subsequently, upon passing through the material, a signal shift or delay respectively of the peak to be detected which will then be associated with the total amount of material in the optical path.

An evaluation of the signal amplitude of the reflector peak utilizes the principle that the THz beam is attenuated upon passing through the material flow. This attenuation can happen due to direct absorption or energy intake respectively of the material or the material respectively which depends on the chemical characteristics, and e.g. even on the moisture taken in or adsorbed by the material. Moreover, when the THz radiation passes through the material particles, always entering and existing the material, i.e. at the boundary surfaces, there will be a partial reflection wherein e.g. between 1 and 5% of the intensity is reflected and, consequently, will no longer be contained in the signal amplitude passed through. Depending on the size the grains may collect a part or the entire cross-section of the transmitted THz beam so that the attenuation of the reflector peak provides an indication of how much material in total is present in the optical path. Such a measurement will e.g. nit be converted directly to the mass because the number of boundary surfaces, i.e. the size and orientation of the grains is also relevant; however, in particular, relative changes can be detected, e.g. by sample classification of material flows and at different measuring positions.

An evaluation may also be carried out by detecting a peak width, e.g. peak width at half height (FWHM) or variance of the reflector peak. This is based on the consideration that the material in the optical path will cause differing delays of the beam leading both to an instantaneous widening of the signal of the reflector peak or even a variance with respect to the spread width of the peak position in successive measurements.

An evaluation may also detect reflection components at peak positions of the signal amplitude outside the reflection peak caused, in particular by the particles to be measured by direct reflections.

According to the invention, for one thing, direct detections and evaluations are possible each at measuring positions, in particular with prior calibrations using the empty guiding device and/or using reference material flows.

According to the invention a relative comparison may be carried out at various points in time at one measuring position.

According to the invention a comparison may be carried out of a measurement at a first measuring position or measuring plane to at least one further measurement at a further (second) measuring position or measuring plane, in particular with a distance between the measuring positions or measuring planes, in particular a distance in the direction of transport or longitudinal axis of a material flow guiding device.

According to the invention, in particular, even relative measurements are possible so as to measure changes, in particular for recognizing areas of the material flow at different measuring positions. Thus, it is possible, to detect in the different measuring principles material accumulations or particles, e.g. even larger, specific grains of material in the material flow as specific or significant structures or patterns in the signal amplitude or a signal characteristic calculated there from and to subsequently recognize these upon further transport at another measuring position.

In particular, at least one partial beam may be decouple from the transmission beam, and the partial beams can then be fed through the guiding device at different measuring positions, in particular in parallel to one another, with defined geometric spacing, with subsequent re-coupling of the reflected partial beams. Thus, it is possible with all measuring principles to detect and recognize the collected material flow areas at different measuring positions so that measurements taken at different points in time or, respectively, measuring positions can subsequently be compare to one another. Then, a transport velocity of the material flow can be determined from the determined time of transport and the known geometric spacing of the measuring positions.

Hereby, it is possible to clearly separate time-of-flight measurements at a time scale e.g. in the Picosecond range in the signal amplitude and several successive measurements carried out e.g. in the Millisecond range.

In a single signal amplitude two or more signal areas ca n be allocated to different measuring positions so that a temporal distance between the signal contributions of the measuring positions is determined directly from the signal amplitude.

Thus, it is possible in principle to detect several, even more than two, measuring positions in the common signal amplitude, whereby the additional out-couplings and re-couplings may be carried out e.g. in that the reflector or reflectors respectively are semi-permeably and thus the share that has passed through is fed to another measuring position, preferably with a difference in the time-of-flight sufficient for separating the signal contributions in the common signal amplitude.

Thus, it is possible, in particular, even using a measuring device with relatively little expenditure in term of hardware, to carry out a full evaluation by means of different evaluations or weighting methods respectively, whereby the various measuring principles collaborate synergistically. Thus, e.g. the measuring principle of permittivity or, respectively, signal delay detects the pure amount of material in the optical path by means of the refraction index, further, the measuring principle of signal absorption detects not only the pure amount of material and chemical characteristics but also the shape and number of grains.

Moreover, e.g. frequency modulated sensors make it possible, when detecting the signal width or frequency shift respectively, owing to the Doppler effect, to consider the lateral velocity of the particles, i.e. a motion component perpendicular to the direction of transport, that will be implicated as additional characteristics e.g. in the signal width or peak width and position.

Moreover, a combination or coupling respectively with further sensors may be provided so as to allow calibration of results to allow for a quantitative detection and for a reconfirmation of the results.

In contrast to e.g. in the citation US 2017/0322064A1, the invention advantageously provides not for a detection of specific resonances of individual phases at certain frequencies of a multi frequency radiation but, rather, for a determination of a reflector peak and a signal property of the reflector peak and/or of a signal section in the signal amplitude defined by the reflector peak. The signal property of the reflector peak and/or of the signal section defined by the reflector peak can then subsequently be evaluated, in particular as a relative comparison with a calibration measurement and/or as a relative comparison at different measuring positions along a direction of transport of the material flow or the guiding device.

By detecting relative changes by a comparison, in particular relative temporal changes at a measuring position and/or comparisons of two different measuring positions, it is possible to carry out relevant evaluations. Thus, e.g. a signal section, which is characteristic in its signal amplitude for the material flow at a measuring position at a first point in time, may be recognized again at a later point in time at a second measuring position. Thus, it is possible e.g. to determine the flow velocity and/or the material throughput of the material flows so that the material throughput can be calculated preferably by means of an electromagnetic measurement without influencing the material flow, i.e. e.g. without a mechanical impeller for detecting a flow velocity.

It has become apparent that a comparison of e.g. signal sections delivers highly accurate values; such a comparison delivers e.g. even an averaging across a region of the material flow, i.e. across the various velocities of the individual material particles flowing in the material flow each with a velocity distribution, i.e. at velocities around an average velocity value. The comparison of the signal sections already preferably delivers such an averaged value.

According to the invention the first and (at least) second measuring position and/or measuring plane, in particular, each exhibit a spacing in the direction of transport or along the longitudinal axis of a material flow guiding device.

Thus, in a production process, such as e.g. an extrusion of fed-in powders or granulates, it is possible to carry out a highly precise in-line detection or current detection of the material and the material throughput which allows for a precise regulation so as to adjust corresponding material throughput values.

The method according to the invention for manufacturing a manufactured object allows for a particularly advantageous, precise in-line detection of the material flow during the manufacturing process. This allows for a highly consistent production.

According to the invention, e.g. a pipe may be manufactured, whereby, according to the invention, the advantage of a consistent production of a wall, in particular a consistent wall thickness, is attained.

When manufacturing an extrusion object, depending on the determined material throughput or material flow respectively it is possible, on the one hand, to adjust or change respectively the material feed-in rate or transport output respectively of the feeder and/or to adjust or change respectively a production setting, e.g. the haul-off speed of the extruded object.

According to the invention, in particular, a material flow with solid state particles such as e.g. a granulate, a powder, or even flakes or chops or fibers can be measured. The material flow can be utilized to manufacture objects made of e.g. plastics, rubber, fibers or similar solid state materials.

Furthermore, it is possible to measure a material flow for manufacturing food, e.g. a powder such as flour, as well as grains, fibers etc. Hereby, even different base materials can be fed-in as material flow and measured so as to generate corresponding mixing ratios.

Furthermore, e.g. tablets, e.g. as medical drugs, may be manufactured from a material flow or several material flows which are measured.

The material flows may, in particular, be transported in gas such as air and/or floated, e.g. even as fluidization of granular or powdered material particles in air or gas, whereupon this material flow will then be measured.

The THz measuring method and the measuring device according to the invention can be utilized not only for controlling a material throughput but generally for characterizing material movements.

Figure 4:
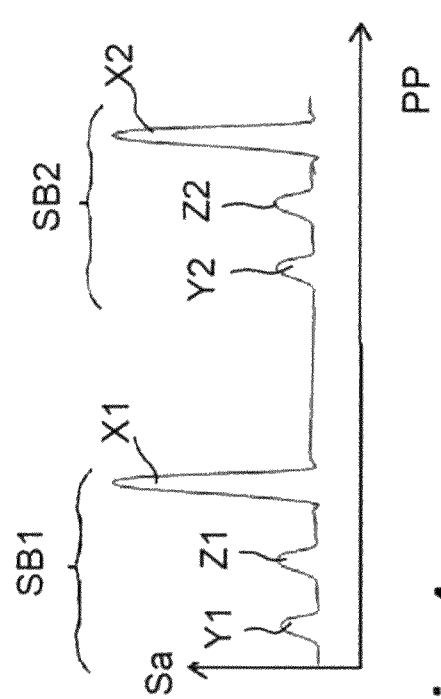
Figure 1:
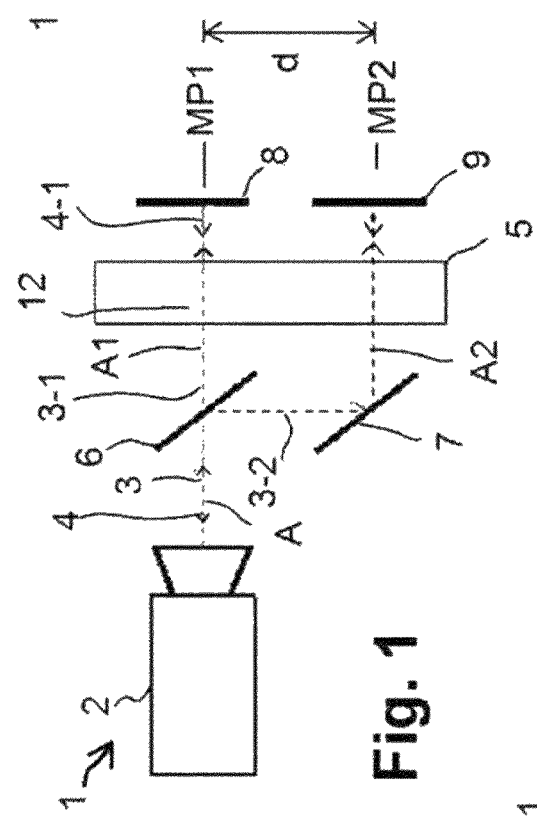
Figure 3:
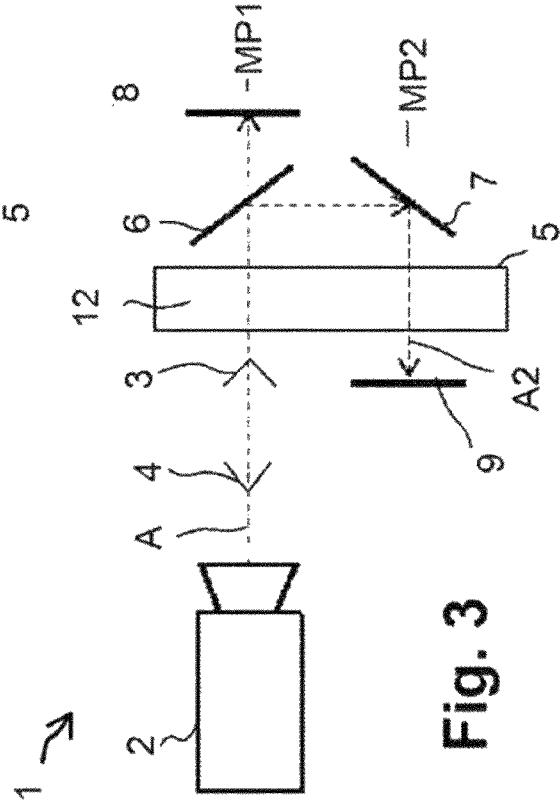
Figure 5:
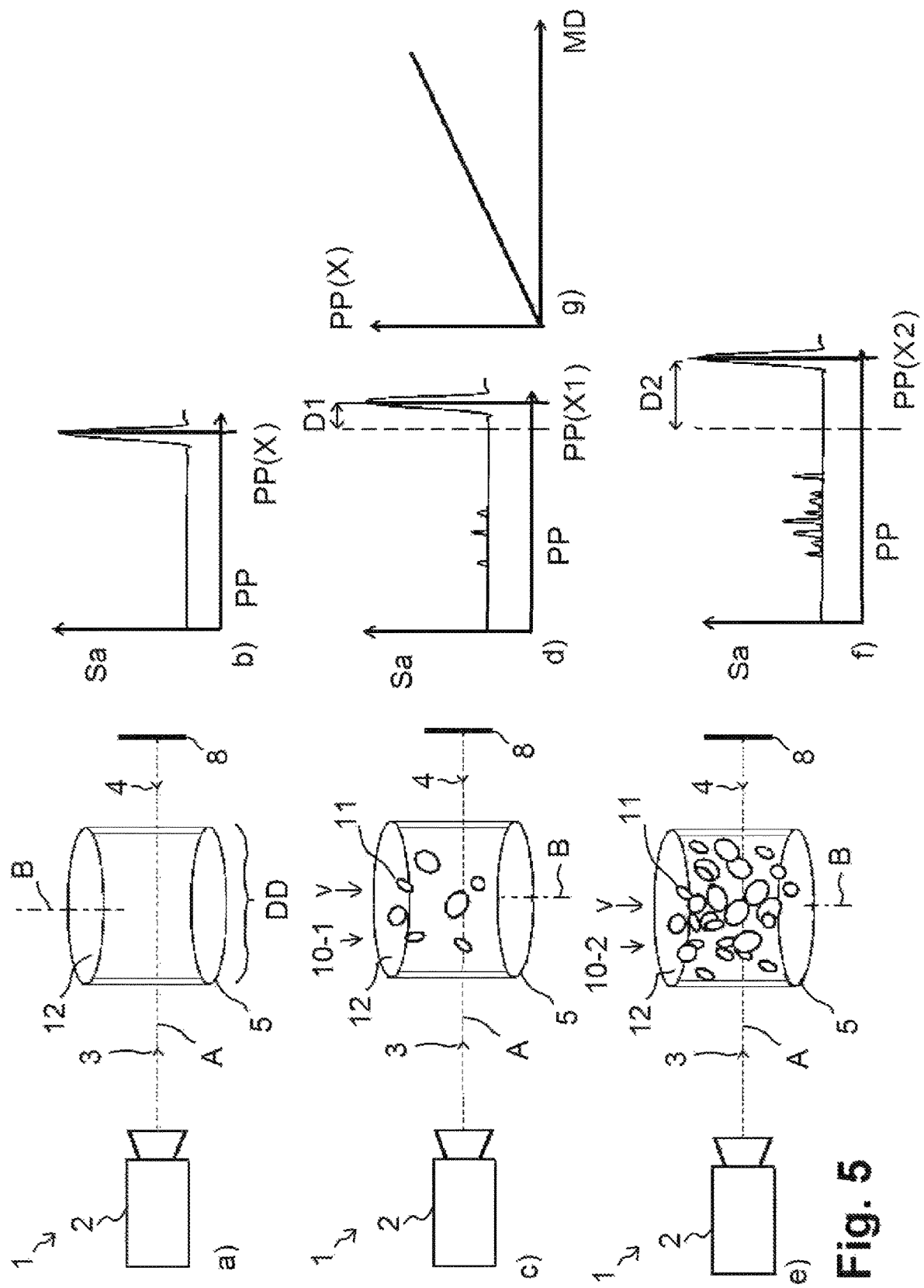
Figure 6:
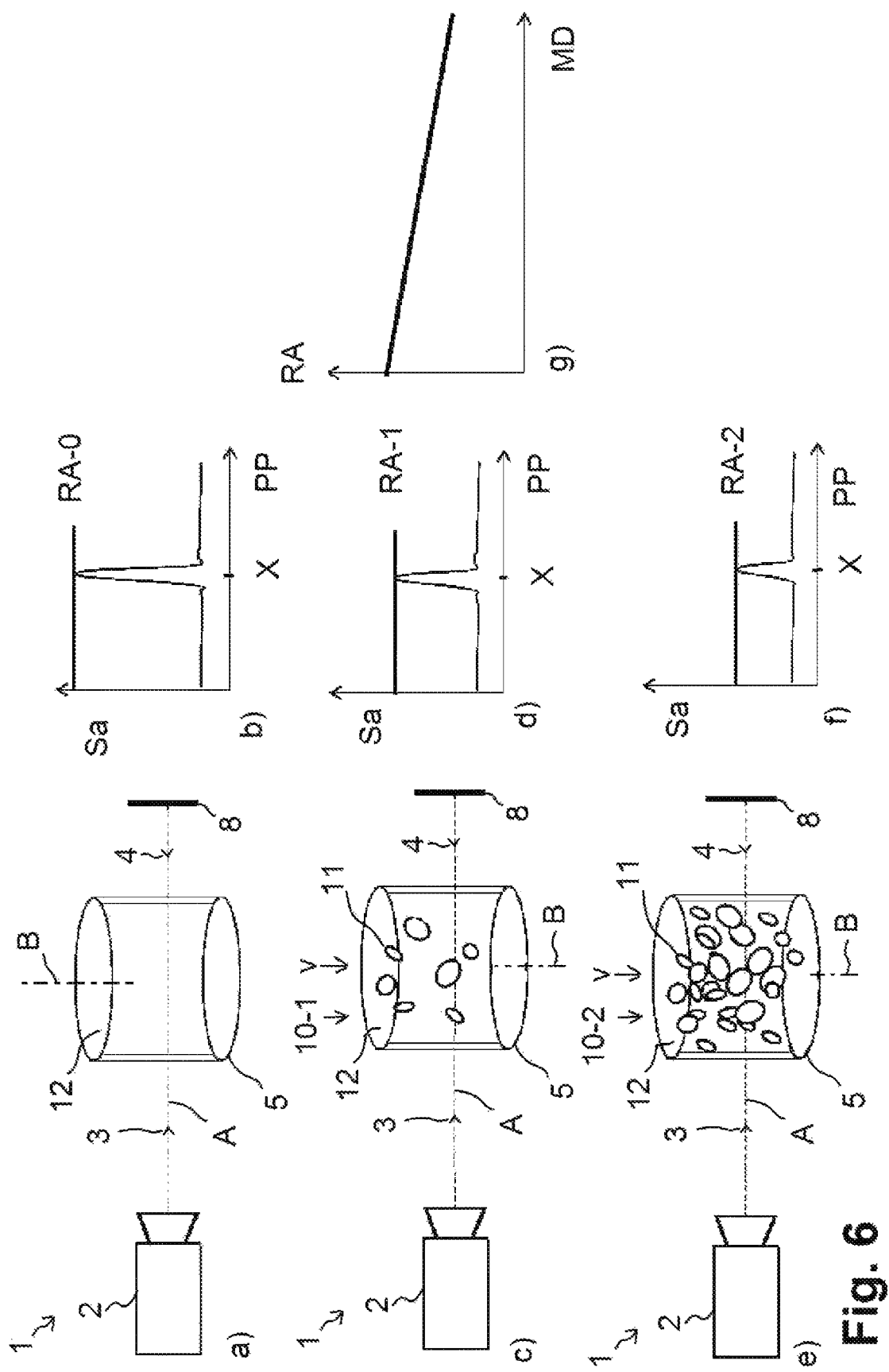
Figure 7:
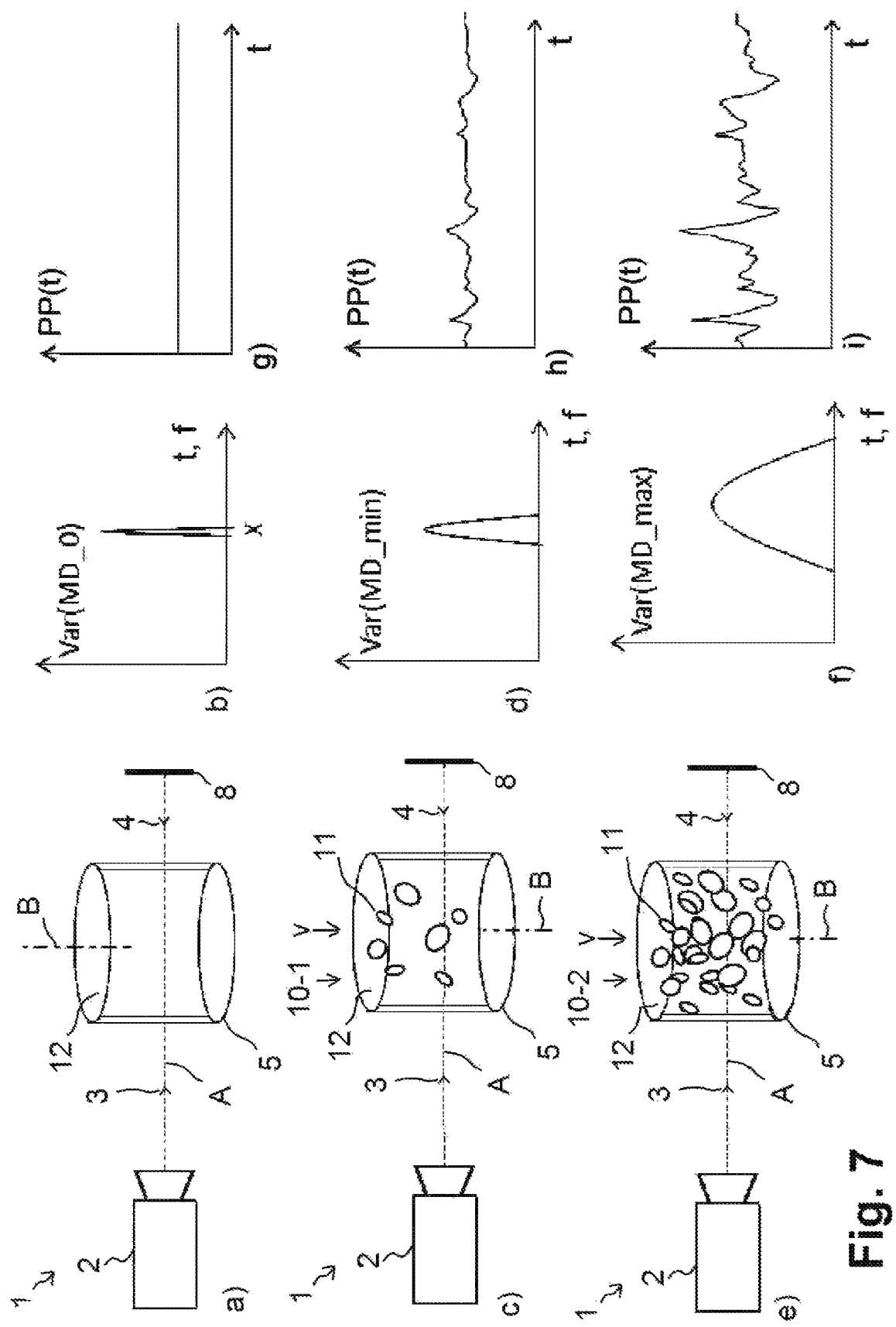

The invention will be further illustrated by means of the attached drawings by means of a few embodiments of measuring devices and measuring methods. It is shown in:

FIG. 1, 2, 3 a THz measuring device according to a first, second and third embodiment for detecting a material flow at two measuring positions;

FIG. 4 a diagram of a signal amplitude as a function of time of the measurements from FIGS. 1 through 3;

FIG. 5 a THz measuring device according to an embodiment for detecting a material flow by determining a permittivity as pulse shift, in particular for detecting a material throughput by correlating the reference positions, including
   a) a calibration measurement and b) the signal amplitude thereof,
   c) a first material flow measurement and d) the signal amplitude thereof,
   e) a second material flow measurement and f) the signal amplitude thereof, and g) the peak position as a function of the material throughput;

FIG. 6 a THz measuring device according to an embodiment for detecting a material flow by determining an amplitude level or amplitude attenuation, in particular for detecting a material throughput by correlating the reference amplitude, including
   a) a calibration measurement and b) the signal amplitude thereof;
   c) a first material flow measurement and d) the signal amplitude thereof,
   e) a second material flow measurement and f) the signal amplitude thereof, and g) the amplitude of the reference mirror influenced by the material flow as a function of the material throughput;

FIG. 7 a THz measuring device according to an embodiment for detecting a material flow by determining a peak width or variance, in particular for detecting a material throughput by correlating the variance, including
   a) a calibration measurement and b) the signal amplitude thereof of an individual measurement;
   c) a first material flow measurement and d) the signal amplitude thereof of an individual measurement,
   e) a second material flow measurement and f) the signal amplitude thereof of an individual measurement,
   g) a representation of the variance or spread respectively across several measurements of the measurement from a), b)
   h) a representation of the variance or spread respectively across several measurements of the measurement from c), d)
   i) a representation of the variance or spread respectively across several measurements of the measurement from e), f)

Figure 8:
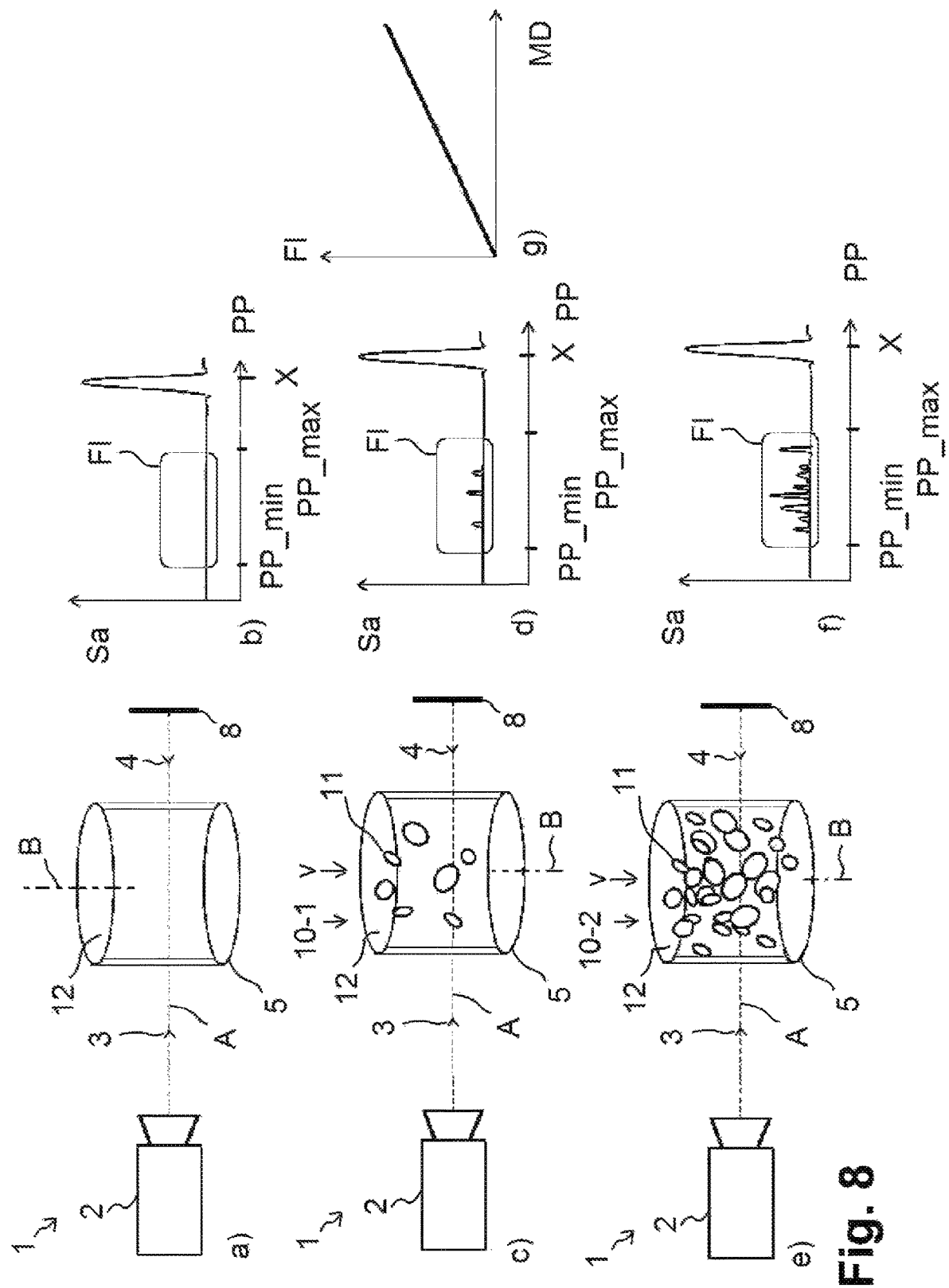
Figure 9:
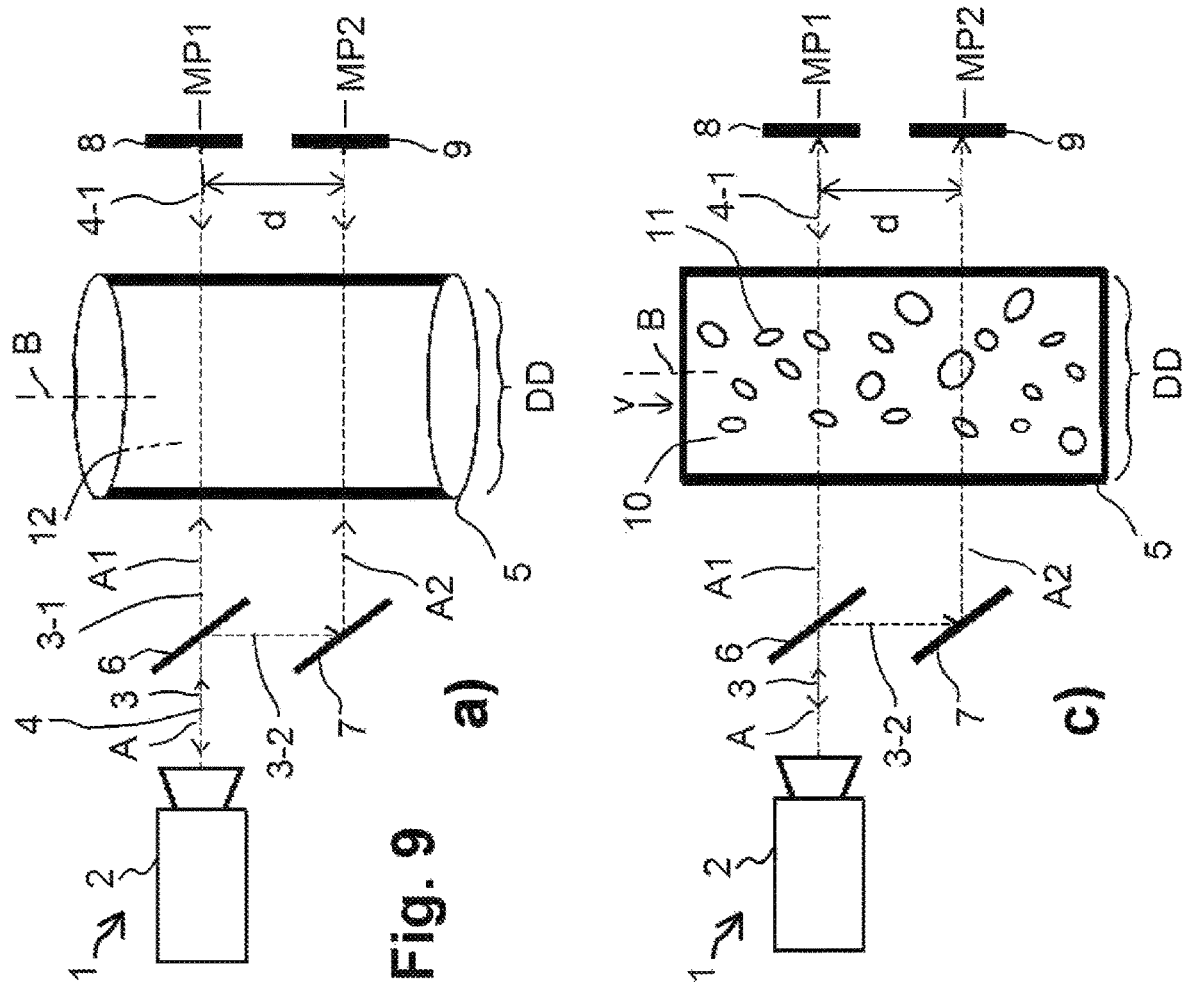
Figure 13:
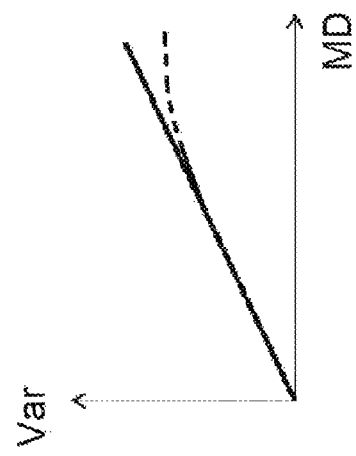
Figure 10:
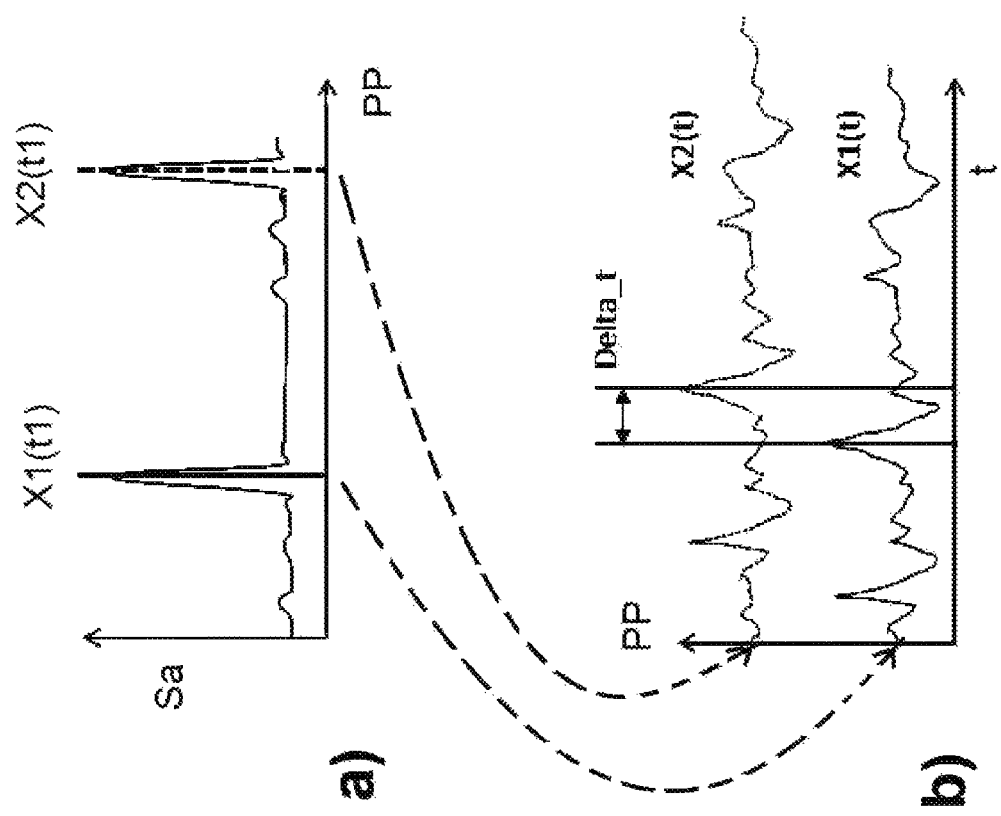
Figure 11:
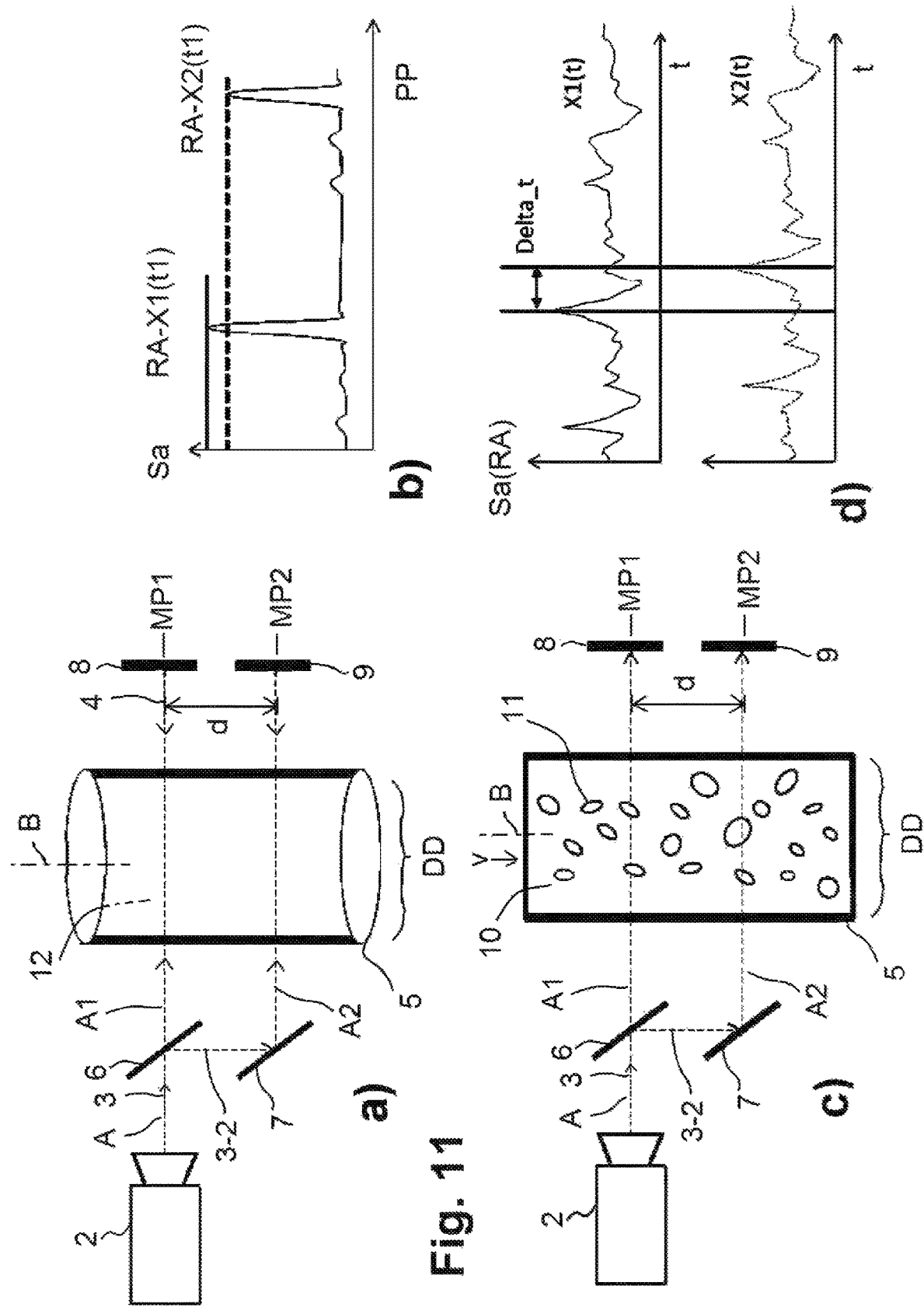
Figure 12:
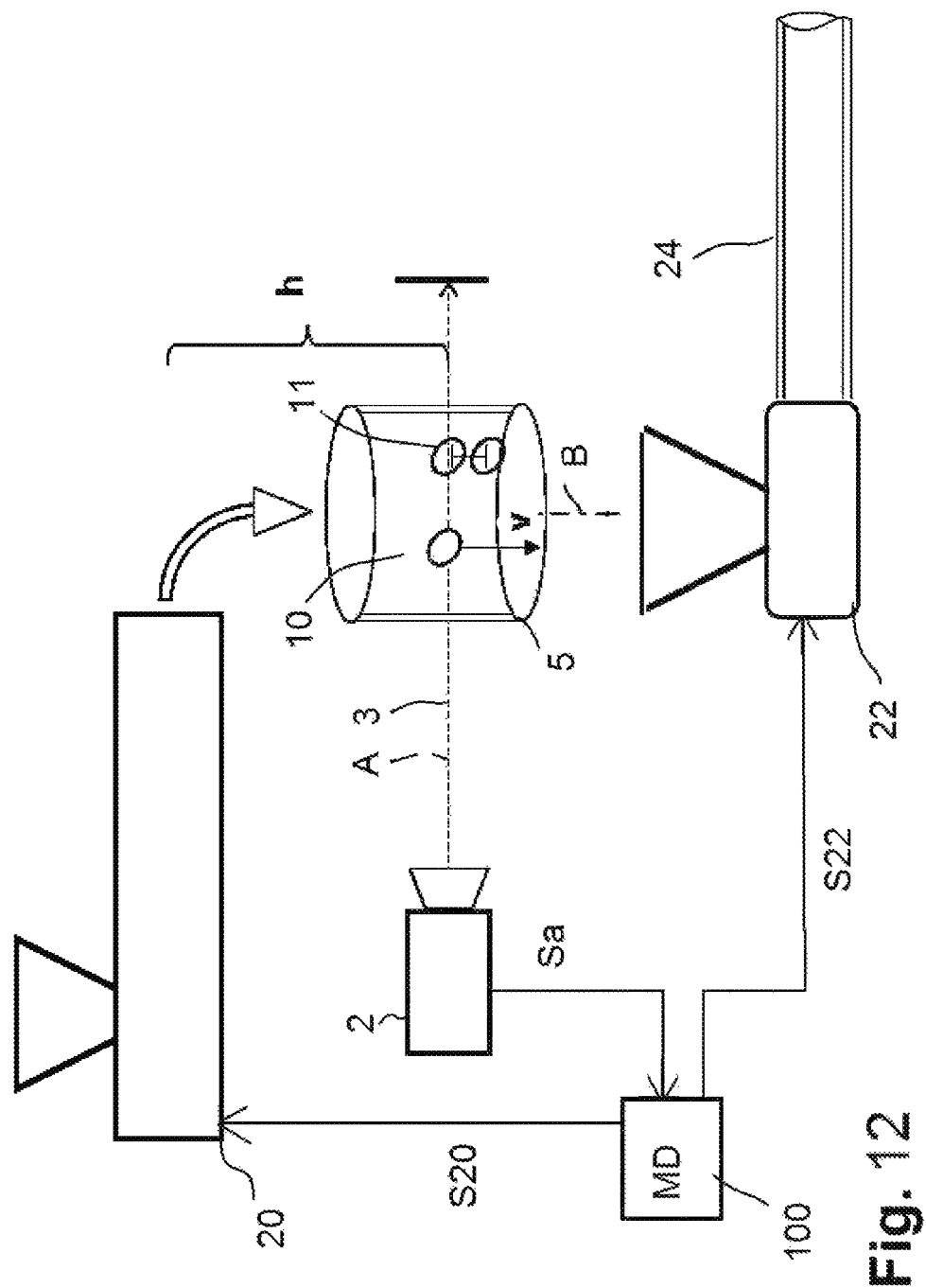

FIG. 8 a THz measuring device according to an embodiment for detecting a material flow by determining further reflection components outside the reflector peak, in particular in particular for detecting a material throughput by correlating the spreading rate, including
   a) a calibration measurement and b) the signal amplitude thereof;
   c) a first material flow measurement and d) the signal amplitude thereof,
   e) a second material flow measurement and f) the signal amplitude thereof, and g) a diagram of the spreading rate as a function of the material throughput;

FIG. 9 a THz measuring device according to an embodiment including coupling and de-coupling of partial beams at two measuring positions, for determining the pulse shifts according to FIG. 5;

FIG. 10 an embodiment of the determination of a material throughput by means of auto-correlation according to FIG. 9;

FIG. 11 a THz measuring device according to an embodiment including coupling and de-coupling of partial beams at two measuring positions, for determining the signal amplitude levels according to FIG. 6, including auto-correlation of the amplitude paths;

FIG. 12 an embodiment of an extrusion arrangement including a THz measuring device according to an embodiment of the invention as controlling of a manufacturing process;

FIG. 13 a diagram of the variance in FIG. 7 as a function of the material throughput.

According to the embodiment of FIG. 1, a THz measuring device 1 comprises a THz sensor 2 which is designed as a THz transceiver, i.e. generates a transmitted THz beam 3 and emits it along an optical axis A, and further detects a THz reflection beam 4 which is reflected back along the optical axis A. The THz measuring device 1 comprises several measuring positions MP1, MP2 which, in these embodiments, lie in different measuring planes. A material flow guiding device 5 is designed e.g. as a plastic pipe, in this case having a perpendicular path. The THz measuring device 1 further comprises optical means for deflecting, de-coupling and re-coupling the transmitted THz beam 3 and the THz reflection beam 4. According to the embodiment of FIG. 1, firstly a coupling and de-coupling device, e.g. a semi-permeable mirror 6, is provided in the optical axis A of the THz sensor 2, which in this case is arranged with a sloped path with respect to the optical axis A thus splitting the incident transmitted THz beam 3 into two partial THz beams 3-1 and 3-2:

The passing share proceeds as the first optical transmitted partial THz beam 3-1 along a first optical measuring axis A1, thus, in this case, in particular, coinciding with the optical axis A of the THz sensor 2. The de-coupled share is subsequently guided as the second optical transmitted partial THz beam 3-2 according to this embodiment through a deflection mirror 7 into a second optical measuring axis A2. The first optical measuring axis A1 is provided in the first measuring position MP1 or the first measuring plane respectively; accordingly, the second optical measuring axis A2 defines the second measuring position MP2 or second measuring plane respectively. The first transmitted partial THz beam 3-1 proceeds along the first optical measuring axis A1 through the guiding device 5 and impinges perpendicularly onto a first reflector mirror 8 so that it is in turn reflected back along the first optical measuring axis A1, passes (partially) through the semi-permeable mirror 6, and again proceeds along the optical axis A towards the THz sensor 2.

The de-coupled transmitted partial THz beam 3-2 proceeds along the second optical measuring axis A2 perpendicularly through the guiding device 5 and perpendicularly onto a second reflector mirror 9 so that it in turn is reflected back along the second optical A2, from the deflection mirror 7 back to the semi-permeable mirror 6, and—partially—reflected back again along the optical measuring axis A towards the THz sensor 2, i.e. re-coupled. Thus, the partial beams overlay each other again to create a common reflected THz beam 4 so that they can be detected in a common signal amplitude Sa of the THz sensor 2. Thus, the spacing d between the measuring positions MP1, MP2 defines an offset in the common signal with the combined amplitude of the THz sensor 2 which will be illustrated in further detail with reference to FIG. 4.

Advantageously, the reflector mirrors 8, 9 reflect fully, however, they may reflect partially only, i.e. be partially permeable. Thus, the incident transmitted THz beam may be allowed to pass in part so as to utilize it again e.g. at a further measuring position. Thus, it is possible in principle to scale up the method to a very large number of measuring positions the signal contributions of which will then preferably be separated in the common signal amplitude due to the times of flight so that they can be suitably received.

FIG. 4 shows the signal amplitude Sa generated by the THz sensor 2, shown here generally as a function of peak positions PP. Depending on the design the THz sensor 2 may directly carry out a measurement of the time of flight of the THz radiation, i.e. put out the signal amplitude Sa as a function of time t, i.e. the peak positions PP represent units of time, e.g. temporal distances in the Picosecond range.

In the alternative, the THz sensor 2 may put out the transmitted THz beam in frequency modulated form and subsequently overlay the transmitted THz beam 3 and the received THz beam 4, whereby the signals frequency shifted with respect to one another form a beat or superimposition respectively, i.e. the peak positions PP are frequency ranges or frequency units, from which the time of flight can then be determined. Thus, e.g. a FMCW radar may be utilized, in particular in FMCW THz technology, in which both a frequency and a phase evaluation is utilized to determine e.g. amplitude positions or boundary surface positions respectively like e.g. in the case of the reflector.

Thus, in the Figures, generally, peak positions PP are designated for the determination of the time of flight, which accordingly can each be physically interpreted as run-times. Since in the following representation dynamic measuring processes are described also, describing, therefore, technical processes changing over time, e.g. a material flow, the designation as peak position PP allows for an improved distinguishability compared with different measuring time t of the dynamic processes, which will display e.g. measuring units in the Millisecond range.

Thus, according to FIG. 4, a signal amplitude Sa is collected which comprises a first signal range SB1, which has been generated in the first measuring position MP1 along the first optical measuring axis A1, and a second signal range SB2, which has been generated in the second measuring position MP2 or, respectively, along the second optical measuring axis A2. In the common signal amplitude Sa both signal ranges SB1 and SB2 can be correlated with one another and still be clearly separated in the evaluation, in particular, when the spacing d is selected sufficiently large. FIG. 1 shows an empty measurement or calibration measurement respectively, i.e. without material flow in the guiding device 5, so that, hereby, a first large reflector peak X1 can be measured in the first signal range SB1 which is formed by the reflection at the first reflector mirror 8, and, accordingly, in the second signal range SB2 a second large reflector peak X2 which has been formed by the reflection at the second reflector mirror 9.

Furthermore, there appears, in each signal range SB1 and SB2 always prior to the large reflector peak X1 or X2 respectively upon passing into the guiding device 5 along the first optical measuring axis A1, a front passing measuring peak Y1, and along the second optical measuring axis A2 a front passing measuring peak Y2, and subsequently, upon exiting the guiding device 5, along the first optical measuring axis A1 a rear passing measuring peak Z1, and along the second optical measuring axis A2 a rear passing measuring peak Z2. Upon closer inspection of the passage of the walls of the guiding device 5 the respective passing measuring peaks Y, Z may even be two peaks, namely representing entry into and exit from the pipe wall.

Moreover, the peaks Y, Z may possibly even be avoided in that the walls of the guiding device 5 are purposefully oriented non-orthogonally in relation to the optical axes A1 and A2.

FIGS. 2 and 3 show, by way of example, further feasible embodiments of a THz measuring device 1 allowing for measurements in two measuring positions MP1 and MP2, i.e. in particular in two optical measuring axes A1 and A2 or, respectively, in two measuring planes through the guiding device 5. According to the embodiment of FIG. 2, the THz sensor 2 emits the transmitted THz beam 3 directly through the guiding device 5, i.e. its optical axis A directly constitutes the first optical measuring axis A1, without any optical means between the THz sensor 2 and the guiding device 5. A semi-permeable plate 6a is positioned perpendicular to the optical axis A behind the guiding device 5 as coupling and de-coupling means so that it directly returns a part of the transmitted THz beam 3 which has passed through the guiding device 5 as partial THz reflection beam; this in turn creates the first signal range SB1 according to FIG. 4. The further component of the transmitted THz beam 3 that has passed through the semi-permeable plate 6a is deflected via two deflection mirrors 7a, 7b towards the second measuring position MP2, i.e. the second measuring plane, where in turn it travels along a second optical measuring axis A2 through the guiding device 5, whereupon the THz beam is reflected back through the second reflector mirror 9 provided being the guiding device 5 and arrange perpendicular to the second optical measuring axis A2. Thus, according to this embodiment, the reflection at the semi-permeable plate 6a forms the first reflector peak X1 of the first signal range SB1 of FIG. 4, and the reflection at the reflector mirror 9 in turn forms the second reflector peak X2 of the signal range SB2. A different in this embodiment of FIG. 2 compared to the embodiment of FIG. 1 is, among other things, that the THz beam fed into the second measuring position MP2 has already passed through the guiding device 5 at the first measuring position MP1; in particular, in the measurements described below, involving a material flow passing through the guiding device 5, such attenuation may be significant and, in particular, even influence already the measuring signal so that the measurements in the measuring positions MP1 and MP2 are not without influence on one another.

According to the embodiment of FIG. 3, the transmitted THz beam 3 travels along the optical axis A, which again also constitutes the first optical measuring axis A1, to the guiding device 5 directly at the first measuring position MP1 and travels behind the guiding device 5 again through the semi-permeable mirror 6 which de-couples a partial beam 3-2 as a coupling and de-coupling means and—like in the embodiment of FIG. 1—deflects it towards the second measuring position MP2 in which again the deflection mirror 7 defines the second optical measuring axis A2 which is aligned offset from and e.g. parallel to the first optical measuring axis A1. Behind the guiding device 5 again the second reflector mirror 9 is provided which reflects the THz beam back perpendicularly. Thus, in the embodiment of FIG. 3 the same optical means 6, 7, 8, 9 are provided as in the embodiment of FIG. 1; however, here, too, the THz beam first passes through the guiding device 5 at the first measuring position MP1 so that the measurements in the measuring positions MP1 and MP2 are not totally without influence on one another.

In all embodiments, it is possible, in particular, to carry out even several de-couplings, i.e. more than two measuring positions MP1, MP2. All embodiments of the FIGS. 1 through 3 can be utilized in the following measuring systems.

Thus, according to FIG. 4, a signal diagram having several measuring areas SBi, i=1,2,3,4, . . . can be determined, the spacing of which can be determined by peak positions PP, i.e. difference in time of flight or distance in frequency, by the spacing d of the measuring planes. Using a higher number of deflection mirrors 7 it is possible, in particular, to even enlarge the signal spacing between the Signal ranges SB1, SB2, . . . .

Hereby, in the case of frequency modulation, it is possible, in principle, to carry out a frequency and phase evaluation.

Furthermore, it is possible, in principle, to determine two or more measuring positions MP1, MP2 in a common measuring plane in that the deflection mirror 7 e.g. deflects the transmitted THz beam 3 in a measuring plane. Thus, the optical measuring axes A1, A2, . . . may run non-parallel, i.e. intersecting in the common measuring plane or in different parallel measuring planes.

FIGS. 5 through 8 show subsequently different measuring principles or different methods respectively for evaluating a material flows; the following FIGS. 9 through 11 then show embodiments of measuring devices applying these measuring principles at several measuring positions or measuring planes respectively for evaluating and/or for measuring a material flow at several positions.

FIG. 5 shows a method for evaluating a material flow 11, in particular a detection of material throughput, involving an evaluation of the permittivity or shaft of von reference positions in the signal diagram, whereby again a THz sensor 2 emits a transmitted THz beam 3 along an optical axis A which is reflected back at a reflector mirror 8 and detected by the THz sensor 2. Hereby, the fact is utilized that the matter of a material flow 10 has a refraction index n10>1, whereby the refraction index n10 in the matter is defined as a quotient of the speed of light in relation to the speed of light in vacuum c0, i.e. n10=c10/c0. Thus, the THz radiation 3 or 3-1, 3-2 respectively takes more time to pass an identical geometric distance. Thus, in the signal amplitude Sa peaks shift towards the right or, respectively, towards higher peak positions PP, i.e. a later time of flight or correspondingly changed frequency in the case of frequency modulation. Thus, FIG. 5a) shows the THz measuring device 1 with the THz sensor 2 and the guiding device 5 as well as the reflector mirror 8 without any material flow 10, i.e. as a calibration measurement, whereby thus, according to b), this results in a signal amplitude Sa having a reflector peak X1 at a peak position PP(X). Here—for clarity—the passing peaks of the transmitted THz beam 3 through the walls of the guiding device 5 are not shown.

FIG. 5c), d) shows a THz measurement in which a first material flow 10-1 of solid state particles 11 passes through the guiding device 5 in the direction of transport B or, respectively, the falling direction. The geometric path DD in the measurement space 12 is identical to that of FIG. 5a). The material flow 10-1 leads, for one thing, to additional reflection peaks in the signal diagram Sa of FIG. 5d) caused, in particular, by direct reflections on the boundary surfaces of the particles of the flow of the material, prior to the reflector peak X, which will not yet be considered at this point, and, on the other hand, due to the prolonged passage time, to a delay of signal D1 of the peak position PP(X) of the reflector peak X which serves here as a reference peak. Accordingly, the signal delay D1 can be determined as a value in peak positions PP.

FIG. 5e), f) shows a corresponding measurement with a thicker second material flow 10-2 which may comprise, in particular, the same or similar solid state particles 11, alas more dense or with towards material throughput respectively. Thus, while the geometric path DD along the optical axis A in the measuring space is equally long geometrically, alas being filled by the material of the second material flows 10-2 to a larger extent, the transmitted THz beam 3 will require a longer time so that the reflector peak X according to the signal diagram of FIG. 5f) is again shifted towards the right, i.e. towards higher peak positions PP(X2), i.e. exhibits a longer signal delay D2 compared to the calibration measurement from FIG. 5a).

Thus, according to FIG. 5, it is possible to evaluate the material throughput already from the signal delay or signal shift D1, D2 of a reference peak, in particular the reflector peaks X of the reflector mirrors 8. Each measurement on its own will initially evaluate the amount of material in the optical path DD of the optical axis A through the guiding device 5, i.e. initially the density of the material flow. This signal delay provides a very accurate estimate of the amount of material the density of the material respectively, where, in particular, the size of the material particles 11 does not influence the measurement result as much as in the subsequent measurement of the absorption. Thus, in each measurement of FIGS. 5c), d) and e), f), the velocity v of the material flow 10-1 or 10-2 along the direction of transport B is not yet a factor so that the material throughput cannot be determined directly, as will then be the case in combination with the embodiment of FIGS. 1-4 according to FIG. 9. FIG. 5g) shows—in a simple model—a conversion between the peak positions PP and the material density or material throughput MD according to this evaluation method. Hereby, it is possible, in particular, to initially carry out a conversion of the particle position PP into the material density, and subsequently the material throughput can be evaluated with the additional consideration of a determined transport velocity v of the material. According to FIG. 5g), a first approximation can be made by utilizing a linear model because a higher material density will initially prolong the time of flight proportionately.

FIG. 6 shows a further embodiment of a THz measuring device 1 and an evaluation method including an evaluation of the reference amplitude X1 of the reflector mirror 8; this detects and evaluates the height of the reference amplitude X. According to the calibration measurement of FIG. 6a), there will again come to exist a measurement in the signal diagram of FIG. 6b) wherein the passing peaks upon the transmitted THz beams 3 passing through the walls of the guiding device 5 are not shown. The signal diagram again shows the signal amplitude Sa as a function of the material throughput, where the reflector peak X determines a reference amplitude RA-0. In case of a lower first material flow 10-1 according to FIG. 6c), the material particles 11 cause an attenuation or decrease respectively of the reflector peak X, i.e. the reference amplitude RA-1 is reduced. This happens, for one thing, due to absorption in the material of the material particles 11, i.e. energy intake in the material, depending, in particular, on the chemical properties of the material of the material particles 11, with e.g. the humidity in the material particles and moisture adhering to the surface of the material particles contributing to such absorption because water effectively absorbs THz radiation. Further, the scatter/reflection of the transmitted THz beam 3 at the material particles 11 will contribute to an attenuation of the signal amplitude: Thus, upon each entry into the surface of a material particle 11 and, likewise, again upon exiting from the material particle 11 the transmitted THz beam 3 will be partially reflected and thereby attenuated. Thus, both the absorption and the scatter of the transmitted THz beam 3 in the path DD cause a reduction of the signal amplitude Sa, i.e. the reference amplitude RA-1 of FIG. 6d is smaller than RA-0. FIG. 6e) again shows a larger second material flow 10-2 which again leads to a further reduction of the reference amplitude RA-2 because both the absorption in the material and the scatter by the boundary surface or surface respectively of the material particles 11 is increased thereby reducing the signal amplitude SH-2.

FIG. 6g) again shows a possible conversion of the reference amplitude RA to the material density or the material throughput MD; here, it is possible, in particular, to initially carry out a conversion to a density of the material particles 11 from which then the material throughput can be determined as material amount per time unit using the additional determination of the velocity v. Thus, FIG. 6g) may show, in particular, a linear or logarithmic decrease of the signal amplitude SH depending on the material throughput or the material density.

Thus, in the methods according to FIG. 6, for a quantitative determination of the material flow, for one thing, the chemical properties of the material of the material particles 11, further, the moisture level, and, in particular, also the grain size and shapes of the material particles 11 are taken into consideration because a material flow made up of many small material particles 11 can lead to a higher scatter than e.g. a material flow made up of large material particles 11, e.g. large grains of a granulate or in case of material flakes.

However, by collecting relative changes, in particular relative temporal changes at a measuring position, and/or comparing two different measuring positions, it is possible already to carry out relevant evaluations, as will be described below.

FIG. 7 shows a further THz measuring device and an evaluation procedure, wherein a peak width or scatter width of successive measurements is utilized, e.g. as variance Var, for evaluating the matter throughput. Here, too, the representations of the FIGS. 7 a), c), e) correspond to those of FIGS. 5 and 6, i.e. FIG. 7a) shows an empty guiding device 5 as calibration measurement and subsequently, according to FIG. 7c), a smaller first material flow 10-1, and FIG. 7e) a larger second material flow 10-2. According to the calibration measurement of FIG. 7a) the reflection at the reflector mirror 8 will result in a very sharp or, respectively, narrow reflector peak X1, i.e. the peak width or signal width, for clarity designated below as variance Var, is small. Hereby, according to the FIGS. 7g), h), i), the stochastically defined variance, i.e. a scatter of the reference peaks as evaluation across several individual measurements within a certain time interval, can be utilized as variance, which hereby represents the number of peak positions on the abscissa PP. Furthermore, the peak width may also, e.g. according to FIG. 7b), d), f), be determined directly at one or more individual measurements, e.g. as peak width at half-height (FWHM), i.e. the width of the signal peak at half the maximum signal amplitude. Other evaluations of the peak width of the reflector peak X1 are possible.

In the subsequent measurement according to FIG. 7c), in the case of the smaller first material flow 10-1, the reflector peak X is widened and/or fluctuates back and forth over time. This widening is caused by the material particles 11 in the material flow 10-1 or 10-2 because the transmitted THz beam 3 and, accordingly, the THz reflection beam 4, in particular, do not form a punctiform cross-section along the optical axis A but, rather, cover an area having lateral dimensions in which, partially from case to case, material particles 11 will be present and also empty spaces between the material particles 11 will be detected. Thus, the THz radiation 3, 4 will be partially delayed and, depending on the number and type of the material particles, widened. This leads to a pure time of flight determination and thereby, in particular, to a "deceleration" or delay respectively of the sharp signal peak 1 of the calibration measurement of FIG. 7b) towards the right because additional material leads to a temporal delay and therewith only later peak positions PP, i.e. further to the right in the signal diagram, will be occupied. In measurements using frequency modulation, where, thus, the peak positions PP represent frequency values, even further effects will appear, e.g. including widenings or shifts respectively owing to the movement of the material particles 11 in the optical axis A, which may, thus, also cause a frequency shift caused by the Doppler effect, which may get overlaid with the frequency modulation of the signal so that a widening of the reflector peak X occurs which, according to FIG. 7d) and FIG. 7f), may also lead to earlier values in the signal diagram, i.e. peak position PP at lower frequency values. Independent of the exact effects leading to the widening of peaks caused by material particles 11, a larger number of material particles 11 will result in an increased variance Var. Hereby, it is possible already to detect not only a higher material density but also, in particular in the case of frequency modulation, also the dynamic behavior, because a higher velocity of the material particles 11 will also result in an increase of signal widenings along the optical axis A caused by the Doppler effect because the material particles 11 in the material flow 10-1, 10-2 will also each whirl or, respectively, exhibit lateral components with respect to their direction of transport B. Thus, the transport velocity v may also be a factor in the variance Var. The increase in variance Var depends, in particular, also on the type and size of the material particles.

Further, it is possible, in principle, when using frequency modulation to carry out a frequency and/or phase evaluation.

FIG. 7g) again shows a possible conversion, here, initially, using a simple linear model. As indicated by the dotted lines, in particular, there may also be a flattening of this conversion curve at higher values so that a, increase in material throughput MD possibly does not lead to a further linear increase but, rather, a flatter curve path. FIG. 13 shows the variance for this case.

FIG. 8 shows a further THz measuring device 1 and an evaluation method, wherein a spreading capacity or, respectively, a correlation of the spreading capacity is determined. The individual Figures or partial Figures respectively of FIG. 8 correspond to those of FIGS. 5 through 7. Hereby, an evaluation of the signal portions of the material particles 11 in the signal amplitude Sa is carried out which, thus, represent the signal portions at peak positions PP before the reflector peak X:

In the calibration measurement according to FIG. 8a) with empty guiding device 5, at first no signal portions of signal particles will appear; possibly, again passing peaks Y, Z according to the above FIG. 4 caused by passing through the walls of the guiding device 5 may again be present, which will not be considered here. However, at first, there will be no reflection from material particles 11.

According to the smaller first material flow 10-1 of FIG. 8c), material particles 11 will then appear in the optical axis A which, depending on their orientation, will reflect the transmitted THz beam 3 predominantly not perpendicularly back along the optical axis A; however, at a certain statistical share the entry or exit surface of a material particle 11 will at times be aligned perpendicular to the optical axis A so that, in this case, there will be a contribution to the reflection which, according to FIG. 8d), can lead to corresponding components or peaks respectively in the signal amplitude Sa. This signal components or, respectively, the spreading capacity SL will then increase according to the larger second material flow 10-2 of FIG. 8e), as is apparent from the signal diagram of FIG. 8f). Hereby, the number of reflection peaks as well as their height and possibly width will increase. This spreading capacity SL can be collected e.g. as surface integral Fl so as to collect both the number and the height of the reflection peaks, whereby the number of the entry or exit surface of the material particles 11 will factor in with the number of reflection peaks, and the lateral extension of the area of the entry or exit surface temporarily aligned perpendicular to the optical axis A will, in particular, also factor in with the height. Other evaluations as a surface integral Fl are also possible to collect this signal component as spreading capacity.

The surface integral may, in particular, be defined relative to the peak position of the reflector peak X, e.g. as an integral of the signal amplitude Sa in a signal segment of the peak positions PP_min through PP_max, which are determined relative to the peak position of X.

FIG. 8g) again shows a possible conversion of the spreading capacity, e.g. of the surface integral Fl into the material throughput MD, here, at first, with the approach of a linear relation between the surface integral Fl and the material throughput MD, whereby, here, even detailed considerations cans be carried out. In particular, again a calibrated measurement or, respectively, coordination with other measuring methods will be helpful.

These carious methods according to FIGS. 5 through 8 allow, first of all, for evaluations or evaluating methods respectively independent of one another which, in particular, can be combined with one another. Such combination may, in particular, also serve to calibrate or coordinate respectively the conversion curves according to FIGS. 5 e), 6e), 7e), 8 e).

The FIGS. 9 through 11 show, by way of examples, embodiments or methods respectively for evaluating a material flow, wherein for evaluation purposes a measuring device at two measuring positions, as described in principle in FIGS. 1 through 4, is combined with measuring principles according to FIGS. 5 through 8, in particular, in order to detect a material throughput MD and/or to gather further information on a material flow.

FIG. 9 shows a measuring device or, respectively, a method for evaluating a material flow, wherein the measuring principle, shown already in FIG. 5 above, of correlating the permittivity, i.e. the temporal shift of the peak position of defined reflection peaks, in particular the reflection peak X of the reflector mirror 8, is utilized at two measuring positions in that partial beams are de-coupled according to FIGS. 1 through 4. Here, FIG. 9 shows, in exemplary fashion, the THz measuring device 1 from FIG. 1; however, it is also possible to utilize e.g. the THz measuring devices 1 from FIG. 2 or 3; further, it is also possible to de-couple partial beams for more than two measuring positions MP1, MP2.

Thus, according to FIG. 9, the calibration measurement shown in a) will supply the signal amplitude Sa shown in the signal diagram b) as a function of the peak positions PP, i.e. in particular, time or frequency. Thus, according to the calibration measurement of FIG. 9a), in the first signal range SB1 the reflector peak X1 will result from the reflection on the first reflector mirror 8 and, correspondingly, 9 in the signal range SB2 the second reflector peak X2 from the reflection on the second reflector mirror 9. Thus, this calibration measurement can be collected and stored at a point in time t1. Subsequently, according to c), a material flow 10 will be guided through the guiding device 5 so that, according to the measuring principle shown above with reference to FIG. 5, there will be pulse shifts in the signal diagram Sa. According to FIG. 9c), d), the pulse shift (temporal delay) D1, D2 is determined by the difference in permittivity of the material flow 10 at two spots, in this case the measuring position MP1 of the first optical measuring axis A1 and the measuring position MP2 of the second optical measuring axis A2, whereby the measuring positions MP1, MP2 are displaced accordingly by the vertical spacing d. In the partial FIG d), the calibration measurement from b) is shown anew, with the current measurements at time t2 being shown by dotted lines. Thus, depending on the material at the measuring positions MP1 and MP2 there will be a pulse shift D1, D2, i.e. change (increase) of the peak positions of the reflection peaks X1, X2. Thus, according to FIG. 9, it is possible already to estimate an amount or material in the optical path DD at both measuring positions MP1, MP2. This already serves as a quantitative detection; further, it is possible to "recognize" transported or, respectively, falling material regions, as will be described below with reference to FIG. 10.

FIG. 10 describes the measuring of the material flow 10 in the guiding device 5 at the measuring positions MP1 and MP2 according to FIG. 9, where FIG. 10a) as singular measurement is registered e.g. upon making the empty measurement of FIG. 9a), and FIG. 10b) upon the dynamic measurement of FIG. 9c) with material flow included. In the diagram of FIG. 10b), the peak position PP of the reflector peaks X1 and X2 from FIG. 10a) is shown as a function of time t. Thus, at each point in time t, e.g. spaced apart by Milliseconds, the peak position PP of X1 and X2 is drawn in, as indicated by the dotted arrows between the FIGS. b) and d), so that a lower curve PP-X1(t) will be created which represents the values PP of the first reflector peak X1 from FIG. 10a), and an upper curve PP-X2(t) representing the values PP of the second reflector peak X2 from FIG. 10a). Thus, the two curves in FIG. 10b) represent the temporal behavior of the signal delay or, respectively, pulse shift D1 or D2 respectively in FIG. 9d). Since, due to the material particles 11 at the first optical partial axis A1 and the second optical v A2, the material throughput will happen unevenly in the following, the temporal changes of the peak positions PP in the two curves will be different. When e.g. in the first optical partial axis A1 a large amount of material, e.g. several or several thick material particles 11, run through the first transmitted THz beam 3-1, the pulse shift (time of flight shift) appearing here will be stronger, i.e. an increase of the peak positions PP, which will generally not be present in the second optical measuring axis A2 at this point in time t.

It has become apparent, however, that the material particles 11 or accumulations of material particles 11 in the measuring positions MP1 and MP2, i.e. correspondingly in the signal ranges SB1 and SB2, can each be recognized or identified respectively, in particular, when the optical measuring axes A1, A2 are arranged here e.g. on the guiding device 5 along the transport direction B exactly vertically on top of one another and parallel to each other. Thus, the signal curves PP-X1(t) and PP-X2(t) as a function of time t will be generally similar. Thus, in FIG. 10b), curve areas of the curve PP-X2(t) and PP-X1(t) are recognized, which may originate e.g. from large flakes or large grains of a granulate. Thus, it is possible here to determine a material transport time Delta_t indicating the material transport between the first measuring position MP1 and the second measuring position MP2.

This recognition of curve areas can be carried out as auto-correlation, whereby corresponding auto-correlation functions (or cross-correlation respectively) or pattern matching or curve recognitions are known as such in signal evaluation. Because the material particles 11 also change in transport between the measuring positions MP1, MP2, e.g.

by turbulence in the material flow 11 and rotation of the material particles 11, the curves of X1 and X2 in FIG. 10b) will not match exactly, however, the corresponding areas can be recognized using suitable correlation methods.

Thus, it is possible to determine a material transport velocity v from the signal diagram which, in particular, can also be compared to other measuring signals or parameters determined, e.g. a transport velocity of the material flows or matter set by the transport device. Thus, according to FIG. 10, it is possible to determine the material transport velocity v of the arrangement from FIG. 9c), e.g. from v=d/Delta_t., if it is assumed that the optical measuring axes A1, A2 are arranged parallel and one below the other and, therewith, the material particles 11 travel the distance d of the measuring positions MP1, MP2 in the guiding device in the material transport time Delta_t.

Accordingly, in the case of e.g. a horizontal guiding device 5, the optical measuring exes A1 and A2 must be arrange horizontally along the direction of transport B and offset from one another in order to cover the respectively correlating areas of the guiding device 5 thereby increasing the possibility of recognizing the material particles 11.

FIG. 11 shows a further embodiment with a detection of the material transport velocity v using auto-correlation, whereby in this case an auto-correlation of the amplitude paths is carried out, i.e. the attenuation of the reference amplitude RA according to the measuring principle of FIG. 6. FIG. 11a), b) again shows a calibration measurement and a signal diagram Sa at two measuring positions MP1, MP2 according to the above explanations relating to FIGS. 1 through 4. Now. in FIG. 11b), the height of the reference amplitude RA of the first reflector peak X1 of the reflection at the first reflector mirror 8 in the first signal range SB1 is indicated, and the height of the reference amplitude RA of the second reflector peaks X2 of the reflection at the second reflector mirror 9 in the second signal range SB2 is drawn in accordingly by a dotted line.

Subsequently, according to FIG. 11c), a material flow 10 is again detected from individual material particles 11 at the two measuring positions MP1 and MP2, which are discrete as such and, thus, again lead to changes in the signal amplitude Sa. As was explained with reference to FIG. 6, the reference amplitudes RA of the reflector peaks X1, X2 are weakened by the absorption by the material, in particular, by scatter on the material particles 11 and absorption of the material itself.

According to FIG. 11d), the so determined values of the two reference amplitudes RA-X1(t) and RA-X2(t) are plotted as a function of time t, e.g. one measuring value each per Millisecond. The passage of material through the optical measuring axes A1 and A2 leads to characteristic curve progressions, where, here again, the passage of material particles 11 can be recognized at the measuring positions MP1, MP2 in the signal diagram. Thus, in FIG. 11d), by means of auto-correlating the measured signal, i.e. the curves RA-X2(t) and RA-X1(t) drawn here, it is possible to recognize the passage of corresponding material accumulations through the optical measuring axes A1 and A2, in particular, again using an algorithm for auto-correlation or, respectively, pattern matching or curve recognition. Thus, here too, it is possible to determine a material transport time Delta_t, representing the duration of the material transport between the measuring positions MP1 and MP2, so that again, similar to FIG. 10, a transport velocity v can be determined, e.g. from v=d/Delta_t.

The so determined material transport velocities v according to FIGS. 10 and 11 can be compared or, respectively, corrected or averaged with one another. Thus, in particular, it is possible to even correct recognizable fluctuations in one of the measuring curves caused by a momentary measuring error or measuring inaccuracy.

FIG. 12 shows a corresponding arrangement comprising a feeder device 20, conveying a material and guiding it as a material flow 10 through the conveyor means 5, in this case e.g. along a vertical path but, in principle, even in a horizontal or otherwise oriented path. Thus, in the case of the conveyance shown here, the material falls down a drop height h in a fall time t, corresponding to a velocity v. As further shown in FIG. 12, the material flow 10 can subsequently be received by a production means 22, in this case an extruder 22, so as to extrude a manufactured object 24. Hereby, the THz measuring device 1 according to the invention allows the material flow 10 to be adjusted with high precision, in particular, it is possible, even when several different components are fed in, to measure and adjust the several material flows intendent of one another.

Thus, these measurements can be carried out in addition to or in lieu of a gravimetric/volumetric analysis, in which a material flow of a solid, in particular powdery or granular, product, is gravimetrically detected upon passing through via a scales or is transported purely in a controlled manner without a sensor system. The detection of the material flows may generally be carried out at any position within the process so that, here, a throughput detection using a THz sensor system may be carried out in combination or separately, e.g. already in the area of aspiration of the material or even in the area of the transport of the material towards the production process, within a dispensing or gravimetric/volumetric analysis unit, upon feeding e.g. towards the extruder or a processing device or even with such a device.

The precise adjustment of the material feed-in per unit of time, e.g. in kg per hour, is important, in particular, in the production of extrusion objects, in order to e.g. precisely adjust the wall thickness of plastic pipes that are being extruded, and precisely adjust the composition from several components.

Thus, by virtue of the THz measuring device according to the invention, in particular, a regulation including a controller device 100 can also be realized, which utilizes the THz measuring method according to the invention or, respectively, the THz sensor 1 according to the invention and the so generated evaluation signals to adjust the conveyor means 20, i.e. a regulation of the transport output of the feeder device 20 via transport output control signals S20 and/or extruder control signals S22 for adjusting the extrusion velocity, so as to adjust one or more components depending on the material throughput MD, and/or changing the haul-off speed of the extruded object.

Thus, when feeding in several components, in particular, several conveyor means 5 will be provided together feeding basic materials towards the extruder 22, each as a material flow 10.

LIST OF REFERENCE NUMERALS

1 THz measuring device
2 THz sensor
3 transmitted THz beam
3-1 first partial transmitted THz beam
3-2 second partial transmitted THz beam, de-coupled beam
4 THz reflection beam
4-1 first partial THz reflection beam 5 material flow-guiding device, e.g. plastic pipe
6 semi-permeable mirror
7, 7a, 7b deflection mirror
8 first reflector mirror
9 second reflector mirror
10 material flow
10-0, 10-1, 10-2 various material flows
11 material particles
12 measurement space
20 feeder device
22 production means, extruder 22
24 production object
100 controller and evaluation unit
A optical axis
A1 first optical measuring axis
A2 second optical measuring axis
B direction of transport and/or longitudinal axis of the material flow guiding device 5
d spacing of the measuring positions or measuring planes in the transport direction and/or longitudinal axis of the material flow guiding device
DD path in the measurement space, i.e. geometric distance in the guiding device 5, along the optical axis A, A1, A2
D1 temporal signal delay, peak shift of the reflector peak X
MD material throughput, e.g. in kg/hour
MP1, MP2 measuring positions, measuring planes
PP peak positions in signal diagram, e.g. temporal values in the case of direct time of flight measurement or frequency values in the case of frequency modulation
(PP_min; PP_max) signal range in the signal diagram
RA-X1(t), RA-X2(t) reference amplitudes
S20 transport output control signals
S22 extruder control signals
Sa signal amplitude
SB1 first signal range in the measuring signal
SB2 second signal range in the measuring signal
t, t1, t2 time, different points in time of the measurements
X1, X2 reflection peaks of the reflector mirror 8, 9
Y1, Y2 first passage peaks upon passing through the guiding device 5
Z1, Z2 second passage peaks upon passing through the guiding device 5

The invention claimed is:

1. A method for detecting fluidized particles transported in a gas, the method comprising the steps of:
generating a first transmitted THz beam by means of a THz sensor,
guiding the first transmitted THz beam through the fluidized particles transported in the gas along a first optical axis,
reflecting the first transmitted THz beam which has passed through the fluidized particles transported in the gas by means of a first reflector mirror,
detecting the first reflected THz reflection beam and generating a first signal amplitude,
determining a first reflector peak in the first signal amplitude corresponding to the first reflector mirror,
generating a second transmitted THz beam by means of the THz sensor,
guiding the second transmitted THz beam through the fluidized particles transported in the gas along at least one of the first optical axis or a second optical axis,
reflecting the first transmitted THz beam which has passed through the fluidized particles transported in the gas by means of at least one of the first reflector mirror or a second reflector mirror,
detecting the second reflected THz reflection beam and generating a second signal amplitude,
determining a second reflector peak in the second signal amplitude corresponding to at least one of the first reflector mirror or the second reflector mirror,
evaluating (analyzing) the determined first reflector peak and the determined second reflector peak in an evaluating step,
and determining material properties of the fluidized particles transported in the gas depending on the evaluating step.

2. The method according to claim 1, wherein
first a calibration measurement of a guiding device without any fluidized particles transported in the gas is carried out, while storing a calibration signal amplitude and/or a determined calibration reflector peak of the calibration signal amplitude, and
subsequently the fluidized particles transported in the gas is guided through the guiding device and the first signal amplitude is detected, and
differences of the calibration signal amplitude of the calibration measurement and the subsequent measurement with the fluidized particles transported in the gas are determined, for evaluating the material properties of the fluidized particles transported in the gas.

3. The method according to claim 2, wherein upon carrying out the calibration measurement, in addition, a temporal position, a frequency and/or a phase of the determined calibration reflector peak of the calibration signal amplitude is stored.

4. The method according to claim 2, wherein a signal property of at least one of the calibration reflector peak, the first reflector peak, or the second reflector peak and/or of a signal segment in the corresponding signal amplitude defined by the at least one of the calibration reflector peak the first reflector peak, or the second reflector peak is determined and subsequently evaluated.

5. The method according to claim 4, wherein the following is determined as signal property of the at least one of the calibration reflector peak, the first reflector peak, or the second reflector peak:
a peak position of the at least one of the calibration reflector peak, the first reflector peak, or the second reflector peak and/or
a frequency and/or phase of the at least one of the determined calibration reflector peak, the first reflector peak, or the second reflector peak of the corresponding signal amplitude and/or
an amplitude height as reference amplitude of the at least one of the calibration reflector peak, the first reflector peak, or the second reflector peak and/or
a peak width of the at least one of the calibration reflector peak, the first reflector peak, or the second reflector peak and/or
a signal segment with scatter reflections appearing before the at least one of the calibration reflector peak, the first reflector peak, or the second reflector peak.

6. The method according to claim 5, wherein, in several measurements, and/or in several measurements of the material flow at several measuring positions a change of the corresponding signal property of the at least one of the calibration reflector peak, the first reflector peak, or the second reflector peak is determined.

7. The method according to claim 5, wherein in the evaluating step a temporal change of the peak position of the at least one of the calibration reflector peak, the first reflector peak, or the second reflector peak is determined as change of the permittivity.

8. The method according to claim 5, wherein in the evaluating step a change of the corresponding signal amplitude of the at least one of the calibration reflector peak, the first reflector peak, or the second reflector peak determined as reference amplitude is determined and the change of the reference amplitude is evaluated as a change of the material throughput in the guiding device in the optical path in the guiding device, where a reduction of the reference amplitude is evaluated as an increase of the absorption and/or scatter by the fluidized particles transported in the gas.

9. The method according to claim 5, wherein in the evaluating step a change of a peak width is collected, and an increase of the peak width is evaluated as a change of the fluidized particles transported in the gas, where a peak width is determined by a single measurement and/or by means of a stochastic evaluation of several measurements.

10. The method according to claim 5, wherein in the evaluating step a change of components of the corresponding signal amplitude in a signal segment lying before the at least one of the calibration reflector peak, the first reflector peak, or the second reflector peak is evaluated, where the components of the corresponding signal amplitude are evaluated as scatter reflections, where an increase of the components of the corresponding signal amplitude is evaluated as an increase of the material density or the material throughput.

11. The method according to claim 5, wherein in the evaluating step temporal changes or a temporal behavior of the signal property of the at least one of the calibration reflector peak, the first reflector peak, or the second reflector peak is evaluated as a significant structure, and,
- by measurements at several measuring positions, which are successive in a transport direction or direction of conveyance, and comparison of the temporal changes or the temporal behavior of the signal property, the significant structure is recognized in the temporal behavior of the signal property, and
- a material transport time between the measuring positions and/or a material transport velocity between the measuring positions and/or a material throughput is determined.

12. The method according to claim 5, wherein in the evaluating step a correlation or auto-correlation of the corresponding signal amplitude and/or of the signal property determined from the corresponding signal amplitude is determined, so as to determine a material transport time between the measuring positions.

13. The method according to claim 1, wherein from at least one of the first transmitted THz beam or the second transmitted THz beam several optical transmitted partial beams are de-coupled from a common optical axis,
- where the transmitted partial beams are guided through the fluidized particles transported in the gas and/or through a guiding device at different measuring positions and subsequently reflected back at the measuring positions as reflected partial THz beams,
- the reflected partial THz beams are combined by coupling onto the common optical axis as a common reflected THz beam which is detected by the THz sensor,
- subsequently, in the evaluating step several signal ranges in the signal amplitude, corresponding to the measuring positions, are determined and evaluated.

14. The method according to claim 13, wherein a material transport time is determined from a spacing of the measuring positions and a determined material transport time between the measuring positions.

15. The method according to claim 1, wherein the transmitted THz beam lies in a frequency range of Terahertz, radar or microwave radiation, generated and detected, between 5 GHz and 50 THz, where the signal amplitude is determined as direct time of flight measurement of the THz radiation or frequency shift in the case of frequency modulated THz radiation.

16. A THz measuring device for acquiring fluidized particles transported in a gas, comprising:
- a first reflector mirror for at least partially reflecting THz radiation;
- a THz sensor for emitting a first transmitted THz beam along a first optical axis, receiving a reflected first THz beam reflected by said first reflector mirror along the first optical axis, putting out a first signal amplitude, emitting a second transmitted THz beam along at least one of the first optical axis or a second optical axis, receiving a reflected second THz beam reflected by at least one the first reflector mirror or a second reflector mirror along at least one of the first optical axis or the second optical axis, and putting out a second signal amplitude; and
- a controller and evaluating unit configured to receive the first signal amplitude and the second signal amplitude of the THz sensor and determine material properties of the fluidized particles transported in the gas guided between the THz sensor and the at least one of the first reflector mirror or the second reflector mirror from a comparison of several measurements and/or a temporal behavior of the first signal amplitude and the second signal amplitude.

17. The THz measuring device according to claim 16, wherein THz the measuring device comprises a coupling and de-coupling means, which splits at least one of the first transmitted THz beam or the second transmitted THz beam from a common optical axis into a first partial transmitted THz beam and a second partial transmitted THz beam, and for coupling the reflected partial beams onto the common optical axis, and
- at least one deflection mirror for deflecting at least one of the de-coupled partial beams towards a second measuring position,
- so that the two partial transmitted THz beams are positioned at different measuring positions at a guiding device and are reflected back at the measuring positions by a respective reflector mirror.

18. A THz measuring device for acquiring fluidized particles transported in a gas, comprising:
- at least one reflector mirror for at least partially reflecting THz radiation,
- a THz sensor for emitting a transmitted THz beam along an optical axis and receiving a reflected THz beam reflected by said at least one reflector mirror along the optical axis, and putting out a signal amplitude,
- a controller and evaluating unit configured to receive the signal amplitude of the THz sensor and determine material properties of a material flows guided between the THz sensor and the at least one reflector mirror from a comparison of several measurements and/or a temporal behavior of the signal amplitude, wherein the controller and evaluating unit are configured to carry out a method according claim 1.

19. An arrangement consisting of the THz measuring device according to claim 18 and a guiding device for guiding fluidized particles transported in a gas comprising material particles in a gas.

20. A method for regulating a manufacturing process of a production object, wherein
- at least one material consisting of material particles is fed to a production means by a feeder device as fluidized particles transported in a gas,
- where the fluidized particles transported in a gas is acquired using a method according to claim 1, and a material throughput of the material flow is determined, and depending on the determined material throughput a transport output of the feeder device and/or production settings of the production means are adjusted, for regulating the manufacturing process of the production object.

* * * * *